US011693526B2

(12) United States Patent
Lavery et al.

(10) Patent No.: US 11,693,526 B2
(45) Date of Patent: Jul. 4, 2023

(54) FACILITATING USER INPUT BY PREDICTING TARGET STORAGE LOCATIONS (71) Applicant: INTERNATIONAL BUSINESS MACHINES CORPORATION, Armonk, NY (US)

(72) Inventors: Andrew J Lavery, Austin, TX (US); James Lee Lentz, Leander, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 17/111,142

(22) Filed: Dec. 3, 2020

(65) Prior Publication Data
US 2022/0179932 A1 Jun. 9, 2022

(51) Int. Cl.
G06F 3/0481 (2022.01)
G06N 20/00 (2019.01)
G06F 16/9035 (2019.01)

(52) U.S. Cl.
CPC ........ G06F 3/0481 (2013.01); G06F 16/9035 (2019.01); G06N 20/00 (2019.01)

(58) Field of Classification Search
CPC ......... G06N 5/04; G06N 20/00; G06F 3/0481
See application file for complete search history.

(56) References Cited

U.S. PATENT DOCUMENTS 6,323,884 B1  11/2001  Bird
7,346,846 B2   3/2008  Rossi, Jr.
7,725,419 B2   5/2010  Lee
8,127,240 B2   2/2012  Grotjohn
10,365,758 B1  7/2019  Smith
2005/0198153 A1*  9/2005  Keohane ............. G06F 3/04845
                                                  709/229
2009/0113330 A1   4/2009  Garrison
(Continued)

FOREIGN PATENT DOCUMENTS

KR   20190033821 A   4/2019

OTHER PUBLICATIONS

Bishop, et al., "Deep Learning for Data Privacy Classification," A Major Qualifying Project Report: Submitted to the Faculty of the Worcester Polytechnic Institute In Partial Fulfillment of the Requirements for the Degree of Bachelor of Science, Nov. 4, 2018, 34 pages.

(Continued)

Primary Examiner — Mong-Shune Chung
(74) Attorney, Agent, or Firm — Anthony R. Curro (57) ABSTRACT A method, computer system, and a computer program product for modifying a user interface. Attributes of a source object identified by a user in connection with a user input for storing the source object are determined. Attributes of one or more target storage locations are determined. A target storage location for storing the source object is predicted, along with a confidence value associated with the prediction. The prediction is made using a machine learning model that predicts the predicted target storage location and associated confidence value based on the determined attributes of the source object. A plurality of target storage location usage patterns are determined. The user interface is modified based on the predicted target storage location.

20 Claims, 7 Drawing Sheets

(56) References Cited

U.S. PATENT DOCUMENTS

| | | |
|---|---|---|
| 2010/0083154 A1 | 4/2010 | Takeshita |
| 2013/0080950 A1 | 3/2013 | Alford, Jr. |
| 2016/0173499 A1* | 6/2016 | Bianchi .................. H04L 63/10 726/26 |
| 2017/0140285 A1* | 5/2017 | Dotan-Cohen ......... G06F 3/038 |
| 2018/0011868 A1 | 1/2018 | Allen |
| 2018/0067957 A1* | 3/2018 | Paterson ............... G06F 16/185 |
| 2018/0129950 A1* | 5/2018 | Kumar ................... G06N 20/00 |
| 2019/0196932 A1* | 6/2019 | Adika ................ G06Q 30/0282 |
| 2020/0174967 A1 | 6/2020 | Lee |
| 2021/0216657 A1* | 7/2021 | Saad ....................... G06F 3/065 |
| 2022/0070328 A1* | 3/2022 | Thein ...................... G06F 40/20 |

OTHER PUBLICATIONS

Drop It Wiki, "How to Filter Files and Folders," DropItProject.Com, printed Jul. 14, 2020, pp. 1-3.

Globalscape, "Automating File Transfers with Event Rules," GlobalSCAPE, Inc. (GSB), 2004-2017, pp. 1-200.

IBM, "Response to United Kingdom Intellectual Property Office Examination Report dated May 30, 2022," UK Patent Application No. 2116628.5, dated Aug. 15, 2022, 10 pgs.

United Kingdom Intellectual Property Office, "Combined Search and Examination Report Under Sections 17 and 18(3)," dated May 30, 2022, 8 pgs., Application No. GB2116628.5.

\* cited by examiner

FACILITATING USER INPUT BY PREDICTING TARGET STORAGE LOCATIONS

BACKGROUND

The present invention relates generally to the field of computing, and more particularly to predicting target storage locations for a source object in a user interface in order to facilitate user input.

User data may be stored on a user device or, on a remote storage system, which may be referred to herein as cloud storage. Storing of user data in cloud storage allows the user to access his or her data via multiple devices from multiple locations. In addition, cloud storage is a reliable way to back up data. A user may access a cloud storage system through a web browser and or an application on a smart mobile phone.

A user interface for storing user data may include a directory that shows folders and files. Folders and files may be created, accessed, organized, and deleted by a user. If user data is stored on a user device, all of the files and folders belong to the user of the device. In contrast, data stored in a cloud storage system may be shared with other users. The folders and files shown in user interface for a cloud storage system may accessed by one user or a group of users. If a user decides, for example, to share one or the user's file or folder with another, the user interface for the cloud storage system provides a means to provide another user with access. For example, a group of workers may collaborate by sharing work-related folders. When a user shares content with another user, the shared folder or file may appear in the other user's directory along with folders created by the other user. Examples of cloud-based file storage and synchronization services are Google Drive®, Dropbox®, Microsoft OneDrive®, and Box®.

User interfaces for storing user data allow many different types of interactions. One such interactions is a drag and drop of a source item, e.g., a file, onto a target storage location, e.g., a folder.

SUMMARY

Embodiments of the present invention disclose a method, computer system, and a computer program product for analyzing consequences associated with storing a source object in one of one or more target storage locations, predicting a target storage location likely to be intended by a user, and modifying a user interface to assist the user in moving the source object to the predicted target storage location.

Embodiments of the present invention are directed to a computer-implemented method for modifying a user interface. The method may include determining attributes of source object identified by a user in connection with a user input for storing the source object. Attributes of one or more target storage locations are determined. In addition, the method may include predicting a target storage location for storing the source object and a confidence value associated with the prediction. A machine learning model predicts the predicted target storage location and associated confidence value based on the determined attributes of the source object. Further, a plurality of target storage location usage patterns may be determined. The user interface may be modified based on the predicted target storage location.

In an embodiment, the determining of a plurality of target storage location usage patterns includes determining usage patterns for a user and a user location.

In an embodiment, the determining of a plurality of target storage location usage patterns includes determining usage patterns for a user, and a time and a day of user input.

In an embodiment, the determining of a plurality of target storage location usage patterns includes determining usage patterns for a group of users.

In an embodiment, the predicting by a machine learning model of a predicted target storage location and associated confidence value based on the determined attributes of the source object includes: predicting the predicted target storage location and associated confidence value based on the determined attributes of the one or more target storage locations. In addition, the source object includes a confidential data attribute and a target storage location includes a non-confidential access attribute.

In an embodiment, the modifying of the user interface based on the predicted target storage location includes: providing a gravity effect between the source object and the predicted target storage location.

In an embodiment, the modifying of the user interface based on the predicted target storage location includes: rendering a line between the source object and a target storage location in the user interface. The line is weighted by thickness according to according to a confidence level.

In an embodiment, the modifying the user interface based on the predicted target storage location includes: rendering a line between the source object and a target storage location in the user interface. The line is labeled according to a confidence level.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

The following described embodiments are directed to a system, method, and computer program product for predicting target storage locations for a source object in a user interface in order to facilitate user input. As such, the described embodiments improve the technical field of user interfaces for computer systems. In addition, the described embodiments improve the technical field of data security for computer systems by reducing the likelihood that confidential data will be inadvertently disclosed.

Figure 1:
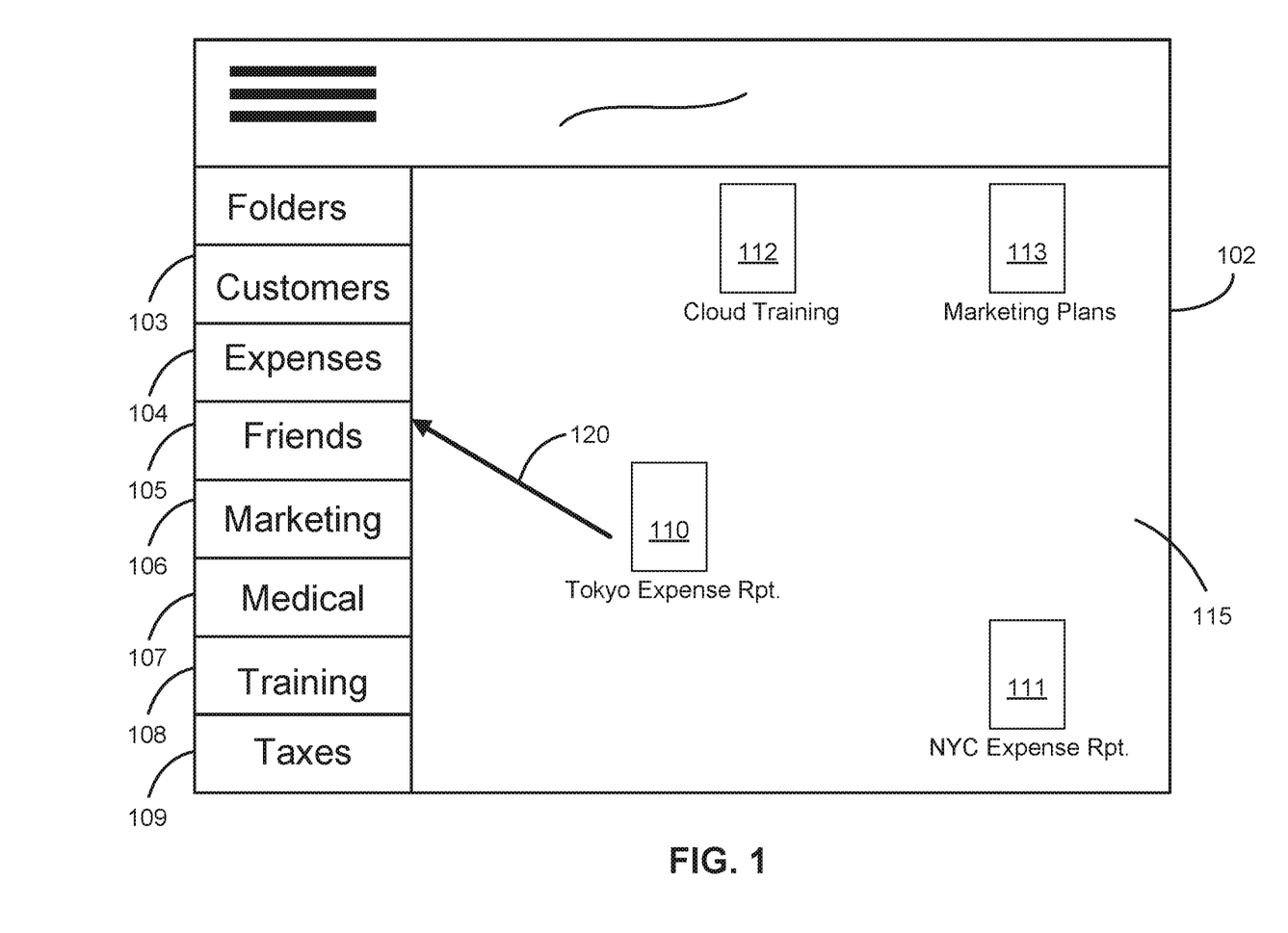
FIG. 1 illustrates a user interface rendered on a display device according to at least one embodiment.

FIG. 1 illustrates a user interface 102 rendered on a display device according to at least one embodiment. The display device may be the display device 616 of computer system 600 described below in connection with FIGS. 6 and 7. The computer system 600 includes various components, described in more detail below, that are capable of enabling the user interface 102 to perform the functions and operations described herein.

The user interface 102 may receive inputs from various sources, including manual input from a user via a mouse, a keyboard, a touch screen, or other input devices. The user interface 102 may also output the data in the user interface 102 onto the display device 616, such that the user interface 102 and any graphical elements in the user interface 102 may be displayed to the user.

The user interface 102 may include any number of graphical elements, such as folders 103-109, folder 112, and files 110-111 and 113. As may be seen the folders 103-109 are arranged in a column on the left side of an active work area 115. The folders 103-109 may be displayed in any order or location. The folder 112, and files 110-111 and 113 are depicted as icons in the work area 115. In this example, the icons in the work area for folder 112, and files 110-111 and 113 are moveable. The folder 112, and files 110-111 and 113 may be moved to any desired location in the work area 115. In addition, the folder 112, and files 110-111 and 113 may be moved in a "drag and drop" action into any one of the folders 103-109 in the left column. The files 110-111 and 113 may also be moved in a "drag and drop" action into folder 112. The "drag and drop" action copies the source item, e.g., a file, onto a target storage location, e.g., a folder. It should be appreciated that embodiments of the invention may be practiced in many different types of user interface and is not limited to the depicted example user interface 102.

The folder 112, and files 110-111 and 113 may be represented by a graphical element. The graphical elements are representative of computer files stored in the volatile or non-volatile memory of computer system 600, and are displayed as icons indicative of a particular type of file. The graphical elements may represent a data file such as, a text document, a spreadsheet, an email message, a calendar event, a video, financial account data, personal tax data, personal medical data, confidential business data, or a folder containing any of these types of data files.

User interfaces allow many different types of interactions. One example interaction is the "drag and drop" copy operation of a source item onto a target storage location. However, users sometimes make a slight mistake that can result in negative consequences. For instance, in a web application, a user might want to drag expense report 110 document to their "Expenses" folder 104, but they accidentally drop it on the folder right below, "Friends" 105, as shown in FIG. 1, resulting in a document that is put in the wrong place. Another example could be a user trying to drag a PDF document into a file repository on a cloud storage system, such as a box.com web page, but they accidentally drop that PDF document into their music app, resulting in the file being copied into the music app. As yet another example, a user may drag a file containing confidential or personal data into a folder of a cloud storage system that is shared with others not having a permission or need to know the confidential or personal information. These slight mistakes may happen more frequently for users with mobility disabilities (such as hand tremors) than for other users, because disabled users are unable to use a pointing device (e.g., a mouse, finger) on a conventional or touch screen display in a precise enough manner to accomplish a task, such as a file move.

According to various embodiments of the present invention, a predictive analysis of consequences associated with one or more targets is determined, and after the analysis, aspects of the user interface 102 may be modified to assist a user to move a source to a target that is classified as or predicted to be a likely user-intended target storage location.

In an embodiment, the user interface 102 is modified so that a gravity effect is perceived by the user. If the user begins to move a graphical object along a path toward a predicted target, the system response for a given amount of user input to a pointing device may be increased. For example, in a drag and drop action in which a file represented by an icon is moved to a folder, user input that would normally be translated into 100 pixels of movement may be translated into 200 pixels of icon movement in the UI when motion is along a path toward the predicted target. Conversely, if the user begins to move the pointing device or graphical object along a path toward a target not likely to be intended, the system response for a given amount of user input may be decreased. For example, in a drag and drop action in which the file icon is moved to a folder not likely to be intended, user input that would normally be translated into 100 pixels of movement may be translated into 50 pixels of icon movement. In an embodiment, the time required for icon movement of either 200 or 50 pixels, in these examples, is the same time normally required for icon movement of 100 pixels. For example, if user input that would normally be translated into 100 pixels of movement in 0.1 seconds, the translated movement of either 200 or 50 pixels would also take 0.1 seconds. In addition, "normal" translation distance and "normal" time may be default or user preferred distance and time settings.

In an embodiment, a velocity effect may be employed (or combined with the gravity effect). The time required to traverse a specific number of pixels in response to user input may be based on the predictive analysis of consequences associated with one or more, or two or more, targets. For example, in a drag and drop action, movement of a file icon along a path toward the predicted target causes the system to speed up movement of the graphical object to get it to the predicted target in a shorter amount of time than the amount of time it would normally take in response to the same user input in the absence of the velocity effect. For example, user input that would normally be translated into 100 pixels of movement in 0.2 seconds may be translated into 100 pixels of icon movement in 0.1 seconds in the UI when motion is along a path toward the predicted target. In contrast, movement of the pointing device or graphical object corresponding with the file along a path toward a target not likely to be intended causes the system to slow on-screen movement of the icon, such that it takes a greater amount of time to get the icon to the predicted target than it would otherwise take in response to the same amount of user input in the absence of the velocity effect. For example, user input that would normally be translated into 100 pixels of movement in 0.2 seconds may be translated into 100 pixels of icon movement in 0.4 seconds in the UI when motion is along a path toward the predicted target.

As further described below, the gravity relationship of items can be learned and adjusted over time, either on an individualized basis (preferences for Mary or John) or on a larger cohort (tendencies of all pediatricians), or a crowd of unaffiliated people.

Figure 2:
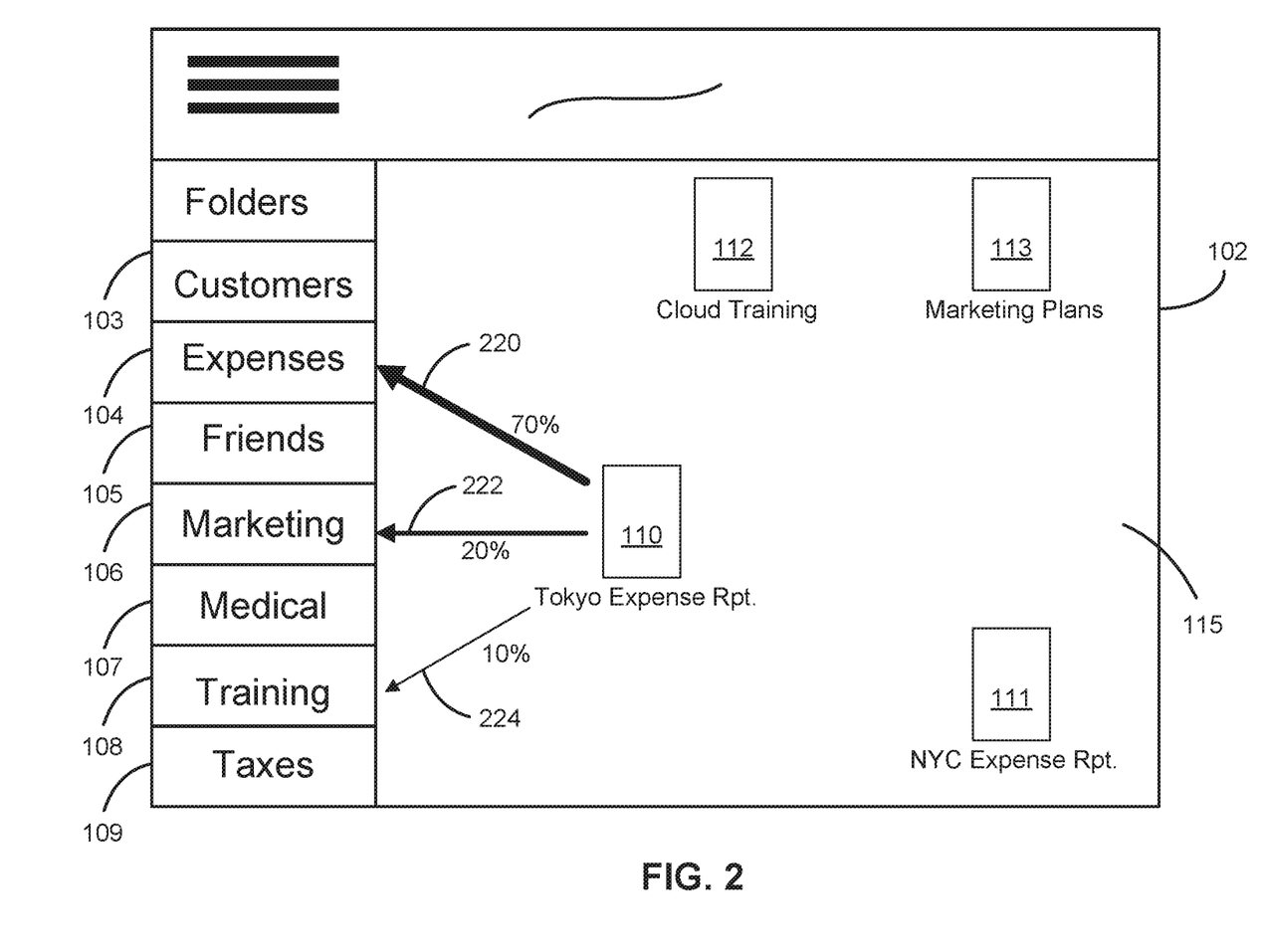
FIG. 2 illustrates a user interface rendered on a display device that includes a visual modification of the user interface according to at least one embodiment.

Referring to FIG. 2, in an embodiment, one or more lines are drawn in the user interface between a file icon that is the source object of a drag and drop action and graphical objects corresponding with possible target storage locations, e.g., folders. The lines may be weighted in thickness and labeled with a probability or confidence level to guide the user to the most appropriate target locations. As depicted in the example of FIG. 2, a line 220 between file 210 (source object) and Expenses folder 104 (first possible target storage location) is heavily weighted and labeled with a probability or confidence level of 70%. Line 222 between file 210 and Marketing folder 106 (second possible target storage location) is lightly weighted and labeled with a probability or confidence level of 20%. Line 224 between file 210 and Training folder 108 (third possible target storage location) is unweighted and labeled with a probability or confidence level of 10%. No lines may be rendered for possible target storage locations associated with a probability or confidence level below a threshold, e.g., probability or confidence level below 10%. For example, no lines are shown for possible target storage locations 103, 105, 107, 109, and 112. The lines may be used to aid or guide movement of a file icon along a path toward the predicted target.

Figure 3:
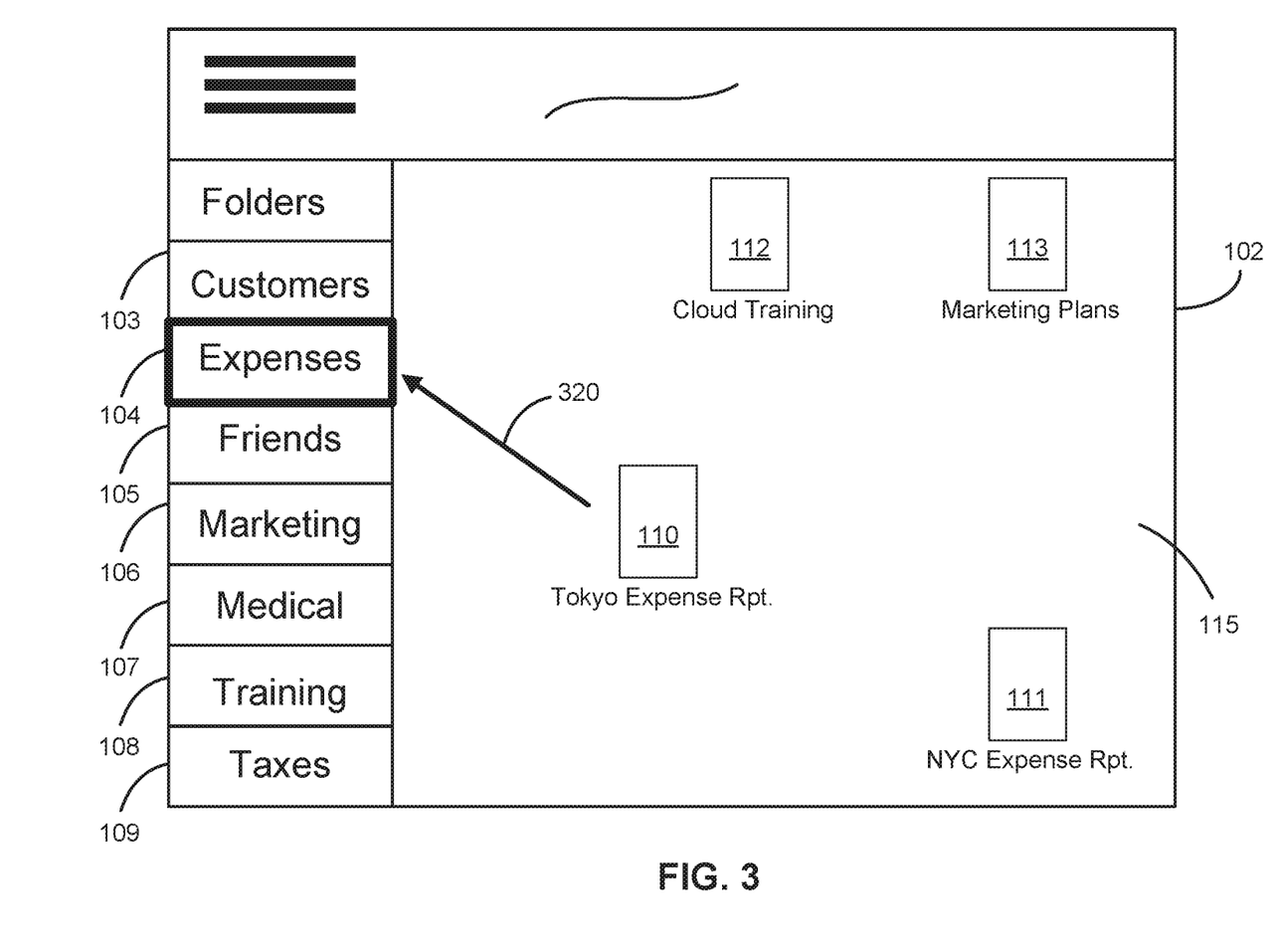
FIG. 3 illustrates a user interface rendered on a display device that includes a visual modification of the user interface according to at least one embodiment.

Referring to FIG. 3, in an embodiment, one or more target storage locations that have been determined to be a likely target may be outlined or otherwise visually highlighted to emphasize its relevance. As one example, FIG. 3 shows Expenses folder 104 is outlined with a heavy line. Highlighting may take the form of changing the color of the target folder for emphasis. Highlighting may take the form of an animation of the icon representing the target folder, e.g., flashing or blinking. Outlining or visual highlighting may be triggered when the confidence interval associated with a predicted target is within a threshold level, e.g., a confidence level of 90%.

Figure 4:
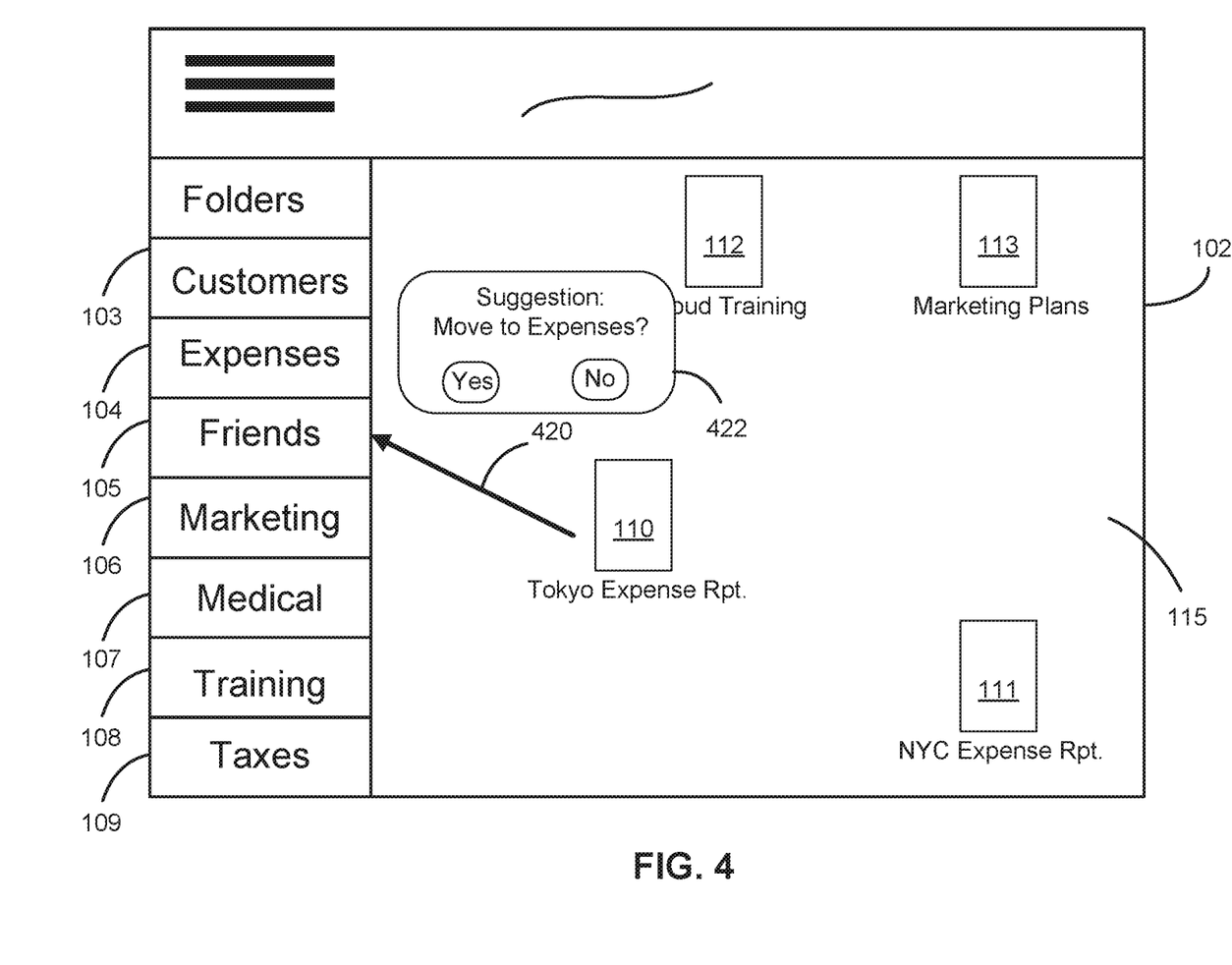
FIG. 4 illustrates a user interface rendered on a display device that includes a visual modification of the user interface according to at least one embodiment.

Referring to FIG. 4, in an embodiment, a confirmation dialog box may be presented if a "mistake" is detected, that is, if a probability or confidence level for a target is below a threshold. Action buttons may be provided in the dialog box to allow the user to fix the mistake. As depicted in the example of FIG. 4, file 410 has been moved in a drag and drop action to Friends folder 105. However, in this example, the probability or confidence level that the Friends folder 105 is the folder the user intended is below a threshold, indicating that movement of the file 410 was likely a mistake. For example, the threshold may be set at 50% and the probability or confidence level may only be 10% that file 410 is intended for the Friends folder 105. Under these conditions, dialog box 422 would be displayed. If the user did not intend to move file 410 the Friends folder 105, i.e., the determined probability or confidence level of 10% was accurate, the user may select the "no" button to "undo" the operation. On the other hand, if the Friends folder 105 was indeed intended, the user may select the "yes" button. In an embodiment, the dialog box could automatically vanish if the user doesn't select anything within a certain period of time, e.g., 5 seconds.

In an embodiment, the threshold for inferring a mistake and displaying a dialog box may be an absolute probability or confidence value. In another embodiment, the threshold may be a relative probability or confidence value in combination with an absolute value. Where two or more targets have confidence values that do not differ by a lot, rather than inferring a "mistake," the dialog box may advise the user to be careful by asking for confirmation. For example, assume a first threshold is defined as being no more than 10% below a target folder having the highest confidence value, provided that the confidence value of the folder having the highest confidence value is greater than 50% (second threshold). To illustrate, assume that the confidence values for three folders A, B, and C are 61%, 54%, and 38%, respectively. A user action moving a source file to target folder B would not be determined to be a mistake because the confidence value of folder A, which has the highest confidence value, is greater than 50%, and the confidence value for target folder B is less than 10% below that of target folder A (61%-54%=7%). However, because the confidence values for the two or more targets do not differ by more than the first threshold, the dialog box asks for confirmation.

Figure 5:
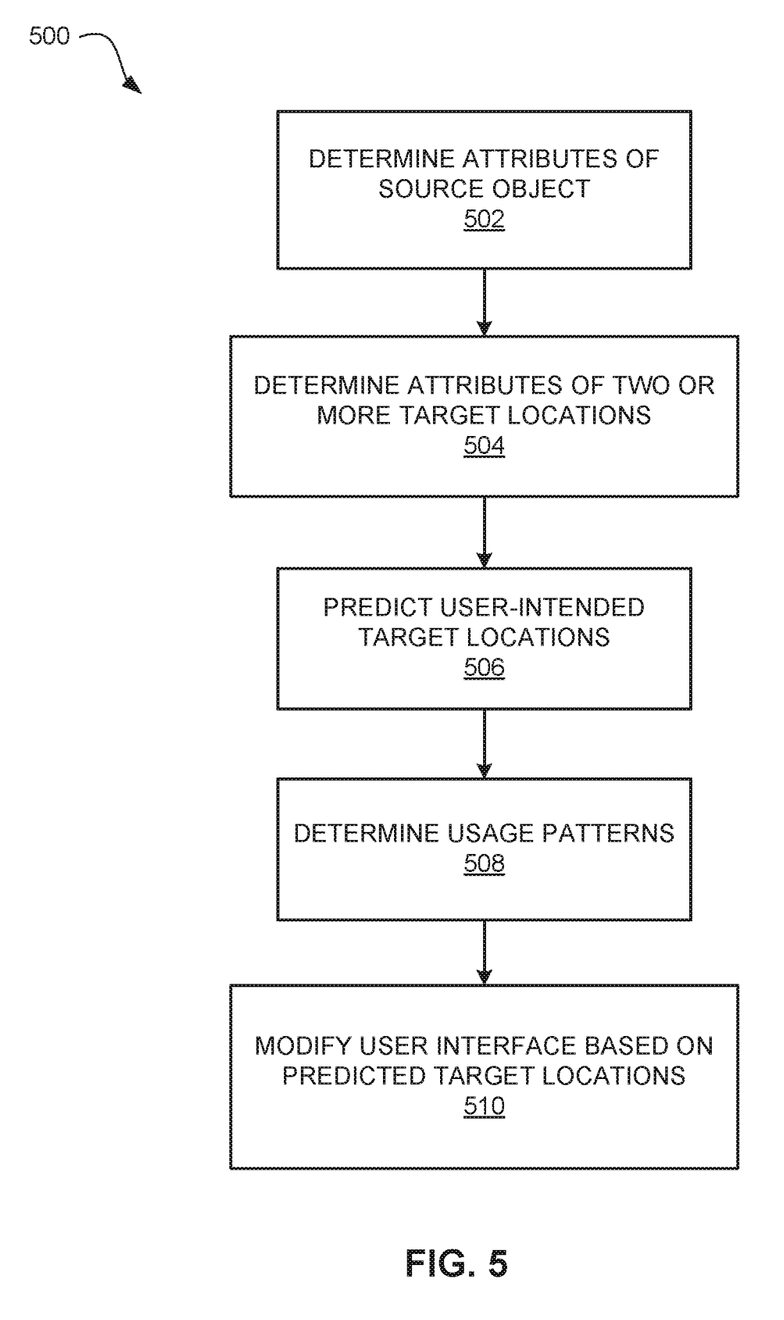
FIG. 5 is an operational flowchart illustrating a process for predicting a target storage location likely to be intended by a user, and modifying a user interface to assist the user in moving the source object to the predicted target storage location according to various embodiments.

Referring now to FIG. 5, an operational flowchart illustrates an exemplary process 500 for analyzing consequences associated with storing a source object in a target storage location, predicting a target storage location likely to be intended by a user, and modifying a user interface to assist the user in moving the source object to the predicted target storage location.

At 502, one or more attributes of a source object, e.g., a file, are determined. The source object may be selected by a user with a user input device in any suitable manner, e.g., a mouse, a finger, or voice command. The attributes may include a title and metadata, such as author, tags, and file type (e.g., .docx, .mp3, .xlsx, .ppt). The attributes may include whether a document is locked for writing, reading, or both. Attributes may be determined using natural language processing of text contained within in the source object itself, as well as in the title and metadata. Any suitable natural language processing tool may be used. In an embodiment, the natural language processing at 502 may use the natural language toolkit (NLTK) to process the textual information of the source object to extract words from the source object. The NLTK is a suite of libraries and programs for symbolic and statistical natural language processing for English language text developed by Steven Bird and Edward Loper in the Department of Computer and Information Science at the University of Pennsylvania. In another embodiment, IBM Watson® AI services may be used. For example, natural language processing may be used to identify attributes such as keywords, categories, topics, emotions, sentiments, and entities.

Attributes extracted using natural language processing are not limited to language data, i.e., text. Extracted attributes at 502 may include numeric data, including social security numbers, account numbers, and monetary values. In addition, numeric attributes may include age, height, and weight medical test result values. Some numeric values may be confidential.

In addition, attributes may be extracted at 502 from images using computer vision techniques. An image may be included in a source object or an image itself may be a source object. In an embodiment, a convolutional neural network may be used to classify or recognize objects in an image. Accordingly, a computer vision technique may be used to classify an image as containing information that identifies a particular individual. An image is not limited to a conventional photograph, but may also include medical images, such as an x-ray or ultrasound image. Some images may be confidential.

Furthermore, attributes may be extracted at 502 from sound file using computer speech recognition technique. A sound file may be included in a source object or a sound file itself may be a source object. A sound file containing speech may be converted to text using a speech recognition tool, such as IBM Watson® Speech to Text service. The resultant text file may be processed using a natural language processing tool as described above. Some sound files may be confidential, e.g., a recording of a meeting where proprietary or trade secret information is discussed. A sound file containing music be tagged with a user specified attribute. For example, a user may specify that all sound files containing musical content are personal. In some embodiments, a music recognition tool, e.g., Shazam®, may be used in conjunction with song fingerprints to determine attributes, such as song title, album, and recording artist and year.

At 504, attributes of at least on target storage location, e.g., a folder, is determined. In some embodiments, attributes of two or more target storage locations are determined. Any of the attributes that are possible for a source object may be an attribute of a target storage location. However, the attribute of a target storage location may be more general and less granular than many attributes of a source object. For example, an attribute of a topic, a person, a project, a group, a classification, or category. Example, attributes for target storage locations include attributes of a personal or private nature, such as personal expenses, friends, professional contacts, music, entertainment, personal photos, resumes, a personal calendar, and personal correspondence. Attributes may also be work related: employees belonging to a team or business unit, customers, business expenses, business requirements, and various forms of work product. Attributes of a target storage location may include whether it is explicitly designated as public or private, as well as which users have permission to access the target. Attributes of a target storage location may be determined using any of the tools and techniques described above for determining attributes of a source object.

At 506, predictions are made for each of the possible target storage locations. A prediction or a classification of a target storage locations as intended by a user for a source object may be made using a machine learning model, such as a random forest or neural network model.

A target storage location may be classified based whether the attributes of the source object correlate with the attributes of the target storage location. Each classification made using a machine learning model may produce an associated confidence interval. In addition, the machine learning model may determine consequences associated with storing a source object in a target storage locations. One example of a consequence that may be determined is a data breach that would occur if a source object containing information of a confidential or sensitive nature is copied to a folder that may be accessed by another without a need or permission to know the information. This inadvertent data breach might occur, for instance, in an environment where folders and files are shown in user interface for a cloud storage system may that be accessed by one user or a group of users. Another example of a consequence that may be determined is an inability to later locate a source object inadvertently stored in target storage location that is not appropriate. For example, storing a work file in a personal folder, or alternatively, storing a personal file in a work folder may make it difficult to locate the file. As yet another example, the consequence of storing a personal medical records in a personal folder for taxes would make the medical records difficult to locate at a later time.

In addition to a machine learning model for classifying target storage locations as user-intended for a source object based on source object attributes, a separate machine learning model, such as a neural network, may classify attributes extracted from a source object according to whether the source object contains information of a confidential or sensitive nature. For example, a machine learning model may classify attributes extracted from a source object related to a particular person as public, personal, or sensitive personal information. Further, the machine learning model may classify attributes extracted from a source object related to an entity as public, proprietary, or trade secret information. The resulting determination of whether the source object contains information of a confidential or sensitive nature may itself be treated as an attribute for use by the main machine learning model that classifies target storage locations as user-intended for a source object based on source object attributes.

The main machine learning model that classifies target storage locations as user-intended for a source object based on source object attributes may tuned or improved over time by incorporating patterns of use that the model receives. Accordingly, predictions that are made at 506 for each of the possible target storage locations may be based on information obtained at instance of 508 at a time prior to the time 506 is performed.

At 508, patterns of use may be determined. A pattern of use is determined from a plurality of destination location decisions by a user. In other words, a pattern of use may be determined when a user selects a particular target storage location for a source object having a particular set of attributes, and then repeats that selection for one or more second a source objects having a similar set of attributes. A pattern of use may serve as "ground truth" training data for training the main machine learning model that classifies target storage locations as user-intended for a source object. As one example, the machine learning model can learn over time that documents with titles that include "expense," or documents that describe a set of dollar expense amounts, are filed into the "Expenses" folder.

It is not required that a pattern of use be determined from a plurality of destination location decisions made by a single user. In some embodiments, a pattern of use may be based on the patterns of a cohort of users. For example, a pattern of use may be based on a group of employees that work in a particular business unit or have a same or similar job description, e.g., a cohort of pediatricians. As another example, a pattern of use may be "crowd sourced," e.g., based on the use patterns of a group of unaffiliated individuals participating via a website hosting a common folder directory, or multiple websites holding similar folder directories.

Determining a pattern of use may additionally take into account a location of a user, time of day, day of the week, or a combination of location and time factors. For instance, a pattern might be detected that on the weekend, when the user is at home, the user works mostly with their "friends" folder. On the weekdays when the user is at the office location, the user almost never works with the "friends" folder.

At 510, the user interface may be modified based on the predicted target storage locations. For instance, in a drag-and-drop scenario, a determination that a target storage location is likely to be intended by the user will increase the gravity (attraction) between source object and the target. The user interface may nudge the source document toward the target, in a manner similar to a "snap to" operation, or according to the methods described elsewhere herein. A user may still override the gravity effect, but depending on the confidence with which the trained model understands the user's intention, the gravity effect of the source object toward the target storage location may be increased. The gravity effect may remain neutral if the confidence of the trained model is not high with respect to the UI action. The gravity relationship of items may be adjusted on an individualized basis according to preference of a single user or a larger cohort of users.

Information may be collected on how well a modified user interface performs. For example, a user interface may be annotated or augmented in a particular way at 510, e.g., a target storage location determined to be a likely target may be outlined in green to emphasize its relevance. If the target is also displayed in green, the emphasis may be subtle and may be overlooked. Information may be collected by querying a user to determine how satisfied the user is with the particular annotation or augmentation. Information may also be indirectly collected by inferring how well a modified user interface performs based on the number of "mistakes" that result when using the interface, i.e., an source object is copied to an unintended folder when using the augmented interface. For example a mistake may be inferred because a user performs a subsequent copy from an unintended folder to an intended folder, or a user response to dialog box asking for confirmation receives an input rejecting the confirmation. Information may be collected from a single user or a plurality of users. The information collected may be used to annotate or augment the user interface in different ways in order to provide more effective enhancements for a particular user or for cohort or larger group of users. As one example, a machine learning model may learn that when the target is displayed in green, it should be outlined in a contrasting color, like red or purple, to emphasize its relevance. Or a model may learn that a user is partially or completely color blind and not emphasize relevance with color generally or with particular colors. As another example, a machine learning model may learn that when the target is displayed in green, it should be also be presented with a line drawn in the user interface between a source object and the target storage location. As yet another example, lines may be drawn in the UI in a particular weight. The model may learn from the collected information that weighted lines labeled with a probability or confidence level result in fewer mistakes than lines that weighted lines without labeling.

Embodiments of the invention can apply to both storage locations and, more generally, any type of classification where there are one or more possible categories. For example, in some embodiments, a "target storage location" can be a repository holding documents for future searching or an archival retention system (having document retention and destruction rules) in an Enterprise Content Management system.

Figure 6:
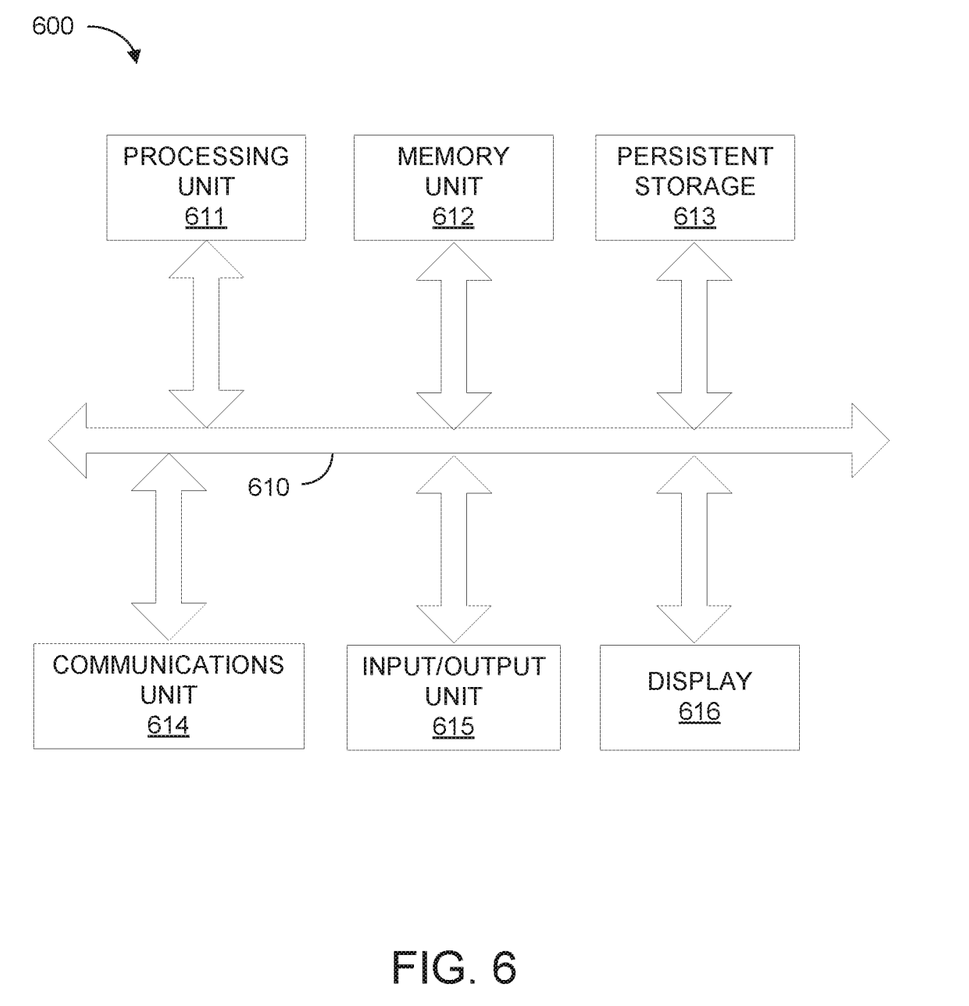
FIG. 6 is a block diagram illustrating a computer system which may be used according to various embodiments.

FIG. 6 is a block diagram illustrating a computer system which may be used as a client, server, or host computer according to various embodiments. As shown, a computer system 600 includes a processor unit 611, a memory unit 612, a persistent storage 613, a communications unit 614, an input/output unit 615, a display 616, and a system bus 610. Computer programs are typically stored in the persistent storage 613 until they are needed for execution, at which time the programs are brought into the memory unit 612 so that they can be directly accessed by the processor unit 611. The processor unit 611 selects a part of memory unit 612 to read and/or write by using an address that the processor 611 gives to memory 612 along with a request to read and/or write. Usually, the reading and interpretation of an encoded instruction at an address causes the processor 611 to fetch a subsequent instruction, either at a subsequent address or some other address. The processor unit 611, memory unit 612, persistent storage 613, communications unit 614, input/output unit 615, and display 616 interface with each other through the system bus 610.

Figure 7:
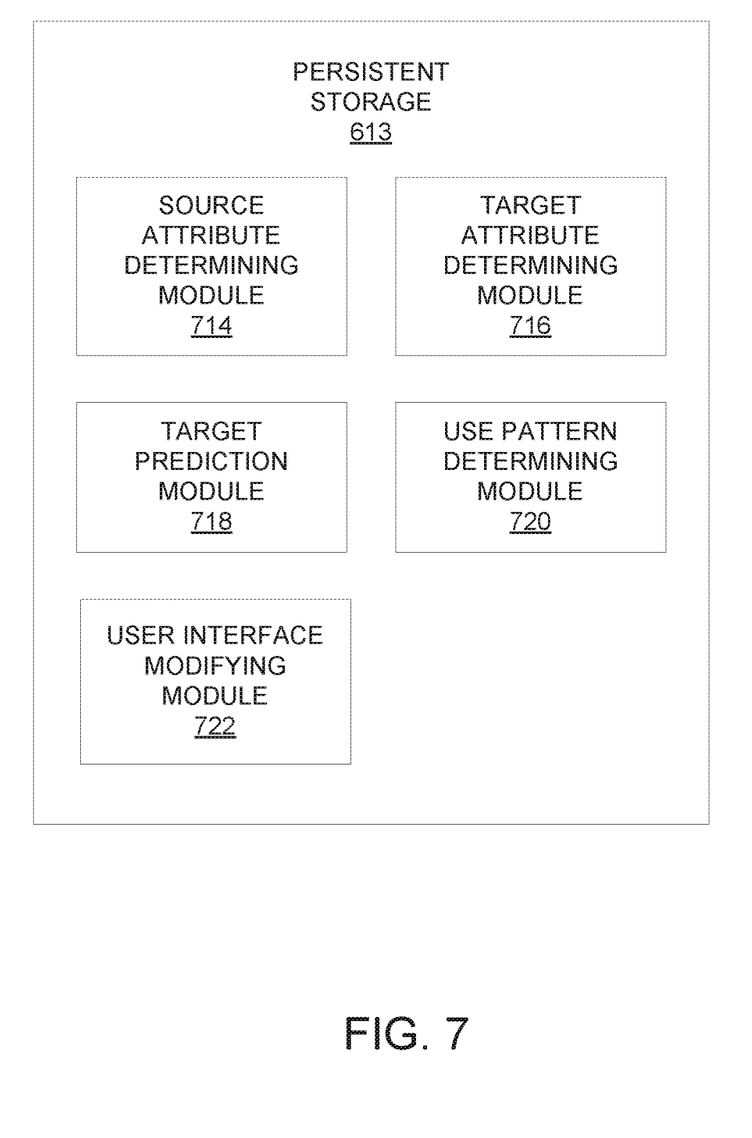
FIG. 7 is a block diagram of a persistent storage of the computer system of FIG. 6.

FIG. 7 is a block diagram of a persistent storage 613 of the computer system 600 of FIG. 6. In various embodiments, the persistent storage 613 may store computer readable program instructions in the form of programs or modules needed for performing various aspects of the disclosed embodiments. The persistent storage 613 may store a source attribute determining program 714 that may be used for determining one or more attributes of a source object, e.g., a file. Aspects of the program 714 are further described with respect to operation 502. In addition, persistent storage 613 may store a target attribute determining program 716 that may be used for determining one or more attributes of a target storage location. Aspects of the program 716 are further described with respect to operation 504. The persistent storage 613 may also store a target prediction program 718 that may be used for predicting whether a target storage location is likely to be a user-intended location for a particular source object. Aspects of the program 718 are further described with respect to operation 506. Further, the persistent storage 613 may store a user pattern determining program 720 that may be used for determining patterns of use. Aspects of the program 720 are further described with respect to operation 508. Additionally, persistent storage 613 may store a user interface modifying program 722 that may be used for modifying a user interface based on one or more predicted target storage locations. Aspects of the program 722 are further described with respect to operation 510.

It should be appreciated that FIGS. 6 and 7 provide only an illustration of one implementation and do not imply any limitations with regard to the environments in which different embodiments may be implemented. Many modifications to the depicted environments may be made based on design and implementation requirements.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for modifying a user interface, comprising:
   determining attributes of a source object identified by a user in connection with a user input for storing the source object;
   determining attributes of one or more target storage locations;
   predicting a target storage location for storing the source object and a confidence value associated with the prediction, wherein a machine learning model predicts the predicted target storage location and associated confidence value based on the determined attributes of the source object and the determined attributes of the one or more target storage locations;

determining a plurality of target storage location usage patterns, the target storage location usage patterns based on historical usage of the user interface by the user; and modifying the user interface based on the predicted target storage location and the determined plurality of target storage location usage patterns, modifying the user interface by providing a gravity effect between the source object and the predicted target storage location, the strength of the gravity effect based upon the confidence value.

2. The computer-implemented method of claim 1, wherein the plurality of target storage location usage patterns are determined associated with and a user location of a user.

3. The computer-implemented method of claim 1, wherein the plurality of target storage location usage patterns are associated with a user, and associated with a time and a day of the user input by the user.

4. The computer-implemented method of claim 1, wherein the plurality of target storage location usage patterns are associated with the user and a group of users.

5. The computer-implemented method of claim 1, wherein modifying the user interface based on the predicted target storage location includes:

rendering a line between the source object and the target storage location in the user interface, wherein the line is weighted by thickness according to a confidence level.

6. The method of claim 1, wherein the source object includes a confidential data attribute and the target storage location includes a non-confidential access attribute.

7. The method of claim 1, wherein the source object contains natural language and the attributes of the source object are determined using natural language processing of text within the source object.

8. The method of claim 1, wherein the attributes of the source object include a title and metadata.

9. A computer system for modifying a user interface, comprising:

one or more processors, one or more computer-readable memories, one or more non-transitory computer-readable storage media, and program instructions stored on at least one of the one or more non-transitory storage media for execution by at least one of the one or more processors via at least one of the one or more memories, wherein the computer system is capable of performing a method comprising:

determining attributes of a source object identified by a user in connection with a user input for storing the source object;

determining attributes of one or more target storage locations;

predicting a target storage location for storing the source object and a confidence value associated with the prediction, wherein a machine learning model predicts the predicted target storage location and associated confidence value based on the determined attributes of the source object and the determined attributes of the one or more target storage locations;

determining a plurality of target storage location usage patterns, the target storage location usage patterns based on historical usage of the user interface by the user; and modifying the user interface based on the predicted target storage location and the determined plurality of target storage location usage patterns, modifying the user interface by providing a gravity effect between the source object and the predicted target storage location, the strength of the gravity effect based upon the confidence value.

10. The computer system of claim 9, wherein the plurality of target storage location usage patterns are associated with a user location of a user.

11. The computer system of claim 9, wherein the plurality of target storage location usage patterns are associated with a user, and associated with a time and a day of the user input by the user.

12. The computer system of claim 9, wherein the a plurality of target storage location usage patterns are associated with a group of users.

13. The computer system of claim 9, wherein modifying the user interface based on the predicted target storage location includes:

visually highlighting the target storage location based on confidence level of the prediction.

14. The computer system of claim 9, wherein the source object includes a confidential data attribute and the target storage location includes a non-confidential access attribute.

15. A computer program product for modifying a user interface, comprising:

one or more non-transitory computer-readable storage media and program instructions stored on at least one of the one or more non-transitory computer-readable storage media, the program instructions executable by a processor to cause the processor to perform a method comprising:

determining attributes of a source object identified by a user in connection with a user input for storing the source object;

determining attributes of one or more target storage locations;

predicting a target storage location for storing the source object and a confidence value associated with the prediction, wherein a machine learning model predicts the predicted target storage location and associated confidence value based on the determined attributes of the source object and the determined attributes of the one or more target storage locations;

determining a plurality of target storage location usage patterns, the target storage location usage patterns based on historical usage of the user interface by the user; and modifying the user interface based on the predicted target storage location and the determined plurality of target storage location usage patterns, modifying the user interface by providing a gravity effect between the source object and the predicted target storage location, the strength of the gravity effect based upon the confidence value.

16. The computer program product of claim 15, wherein the plurality of target storage location usage patterns are associated with a user location of a user.

17. The computer program product of claim 15, wherein the plurality of target storage location usage patterns are associated with a user, and associated with a time and a day of the user input by the user.

18. The computer program product of claim 15, wherein the plurality of target storage location usage patterns are associated with a group of users.

19. The computer program product of claim 15, wherein modifying the user interface based on the predicted target storage location includes:
   rendering a line between the source object and the target storage location in the user interface, wherein the line is labeled according to a confidence level.

20. The computer program product of claim 15, wherein the source object includes a confidential data attribute and the target storage location includes a non- confidential access attribute.

\* \* \* \* \*